(12) United States Patent
Triebel et al.

(10) Patent No.: US 11,025,063 B2
(45) Date of Patent: Jun. 1, 2021

(54) METHOD AND APPARATUS FOR OPERATING AN ELECTRICAL ENERGY STORAGE SYSTEM

(71) Applicant: Aggreko Deutschland GmbH, Dorsten (DE)

(72) Inventors: Clemens Triebel, Berlin (DE); Carsten Reincke-Collon, Berlin (DE); Udo Berninger, Berlin (DE); Tim Tröndle, Berlin (DE)

(73) Assignee: Aggreko Deutschland GmbH, Dorsten (DE)

( * ) Notice: Subject to any disclaimer, the term of this patent is extended or adjusted under 35 U.S.C. 154(b) by 1169 days.

(21) Appl. No.: 15/359,417

(22) Filed: Nov. 22, 2016

(65) Prior Publication Data
US 2017/0077706 A1    Mar. 16, 2017

Related U.S. Application Data

(63) Continuation of application No. PCT/EP2015/061555, filed on May 26, 2015.

(30) Foreign Application Priority Data

May 26, 2014   (DE) .......................... 102014210010.0

(51) Int. Cl.
  *H02J 3/16*    (2006.01)
  *H02J 3/32*    (2006.01)
  *H02J 7/00*    (2006.01)

(52) U.S. Cl.
  CPC .................. *H02J 3/16* (2013.01); *H02J 3/32* (2013.01); *H02J 7/0013* (2013.01)

(58) Field of Classification Search
  CPC .... H02J 3/16; H02J 7/0013; H02J 3/32; H02J 7/0003
  See application file for complete search history.

(56) References Cited

U.S. PATENT DOCUMENTS

2003/0071523 A1* 4/2003 Silverman ............. H02J 7/0021
                                                        307/150
2005/0251299 A1* 11/2005 Donnelly ................ B60L 15/20
                                                         701/19

(Continued)

FOREIGN PATENT DOCUMENTS

DE   10 2005 002 545 A1   7/2006
DE   10 2009 035 853 A1   6/2010

(Continued)

OTHER PUBLICATIONS

Tran, Duong et al. "Energy management and dynamic control in Composite Energy Storage System for micro-grid applications"; IECON 2010, IEEE Industrial Electronics Society, IEEE, Nov. 2010, pp. 1818-1824.

*Primary Examiner* — Rexford N Barnie
*Assistant Examiner* — Thai H Tran
(74) *Attorney, Agent, or Firm* — Osha Bergman Watanabe & Burton LLP

(57) ABSTRACT

In a method for operating an electrical energy storage system, which is connected to an electrical energy supply grid for providing a setpoint power and contains a plurality of storage units, which are electrically connected at a point of common coupling PCC and among which the setpoint power is distributed, the total efficiency of the energy storage system is matched to the setpoint power by adjusting individual power components to be provided by the storage units.

25 Claims, 7 Drawing Sheets

(56) References Cited

U.S. PATENT DOCUMENTS

| | | | |
|---|---|---|---|
| 2007/0164693 A1* | 7/2007 | King | B60L 7/14 |
| | | | 318/109 |
| 2008/0001479 A1 | 1/2008 | Dengel et al. | |
| 2008/0143186 A1 | 6/2008 | Wisch et al. | |
| 2010/0138092 A1* | 6/2010 | Kohn | H02J 7/0091 |
| | | | 701/22 |
| 2012/0056591 A1* | 3/2012 | Abe | H01M 10/3909 |
| | | | 320/132 |
| 2012/0187913 A1* | 7/2012 | Abe | H01M 10/44 |
| | | | 320/134 |
| 2012/0323386 A1 | 12/2012 | Ito | |
| 2013/0110300 A1* | 5/2013 | Sinsabaugh | H02J 7/34 |
| | | | 700/291 |
| 2013/0197710 A1* | 8/2013 | Hansen | H02J 7/0013 |
| | | | 700/297 |
| 2013/0285610 A1* | 10/2013 | Katou | H01M 10/42 |
| | | | 320/125 |
| 2014/0009117 A1* | 1/2014 | Ishii | H02J 7/34 |
| | | | 320/126 |
| 2014/0309800 A1* | 10/2014 | Morin | H02J 13/0062 |
| | | | 700/295 |
| 2016/0334821 A1* | 11/2016 | Lee | H02J 3/32 |

FOREIGN PATENT DOCUMENTS

| | | |
|---|---|---|
| EP | 1 517 021 A1 | 3/2005 |
| WO | WO-2006/072576 A1 | 7/2006 |

\* cited by examiner

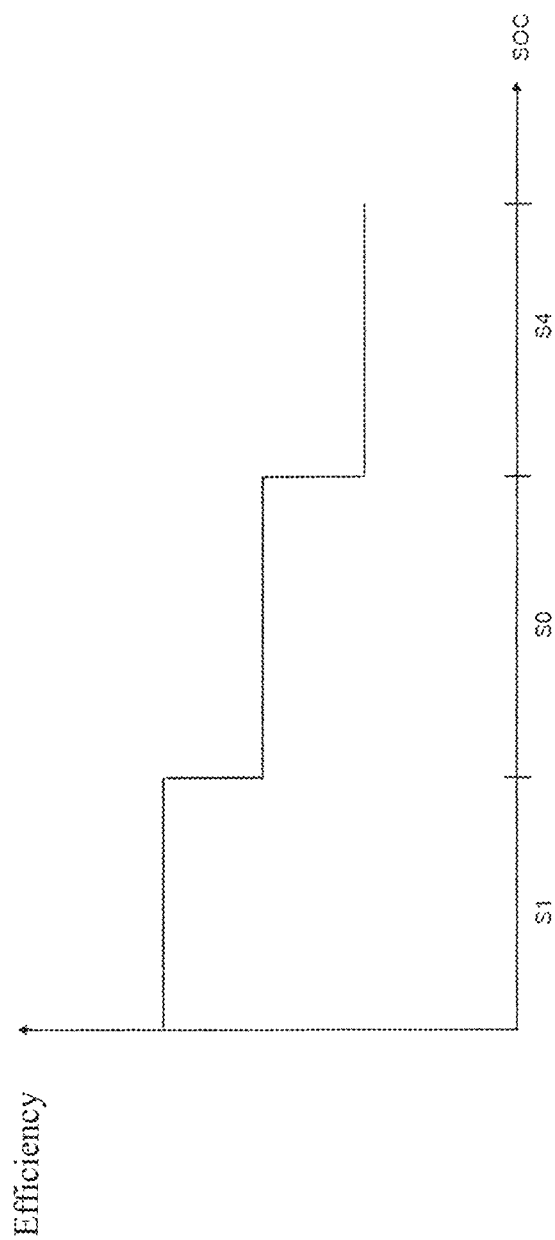

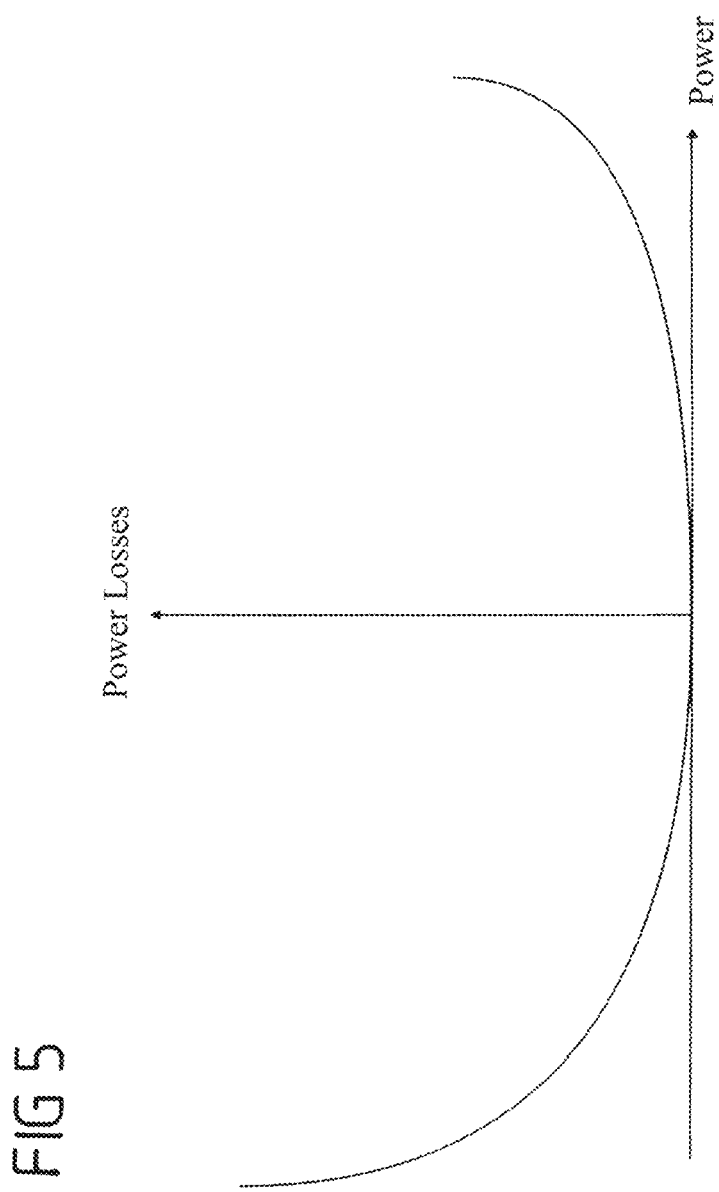

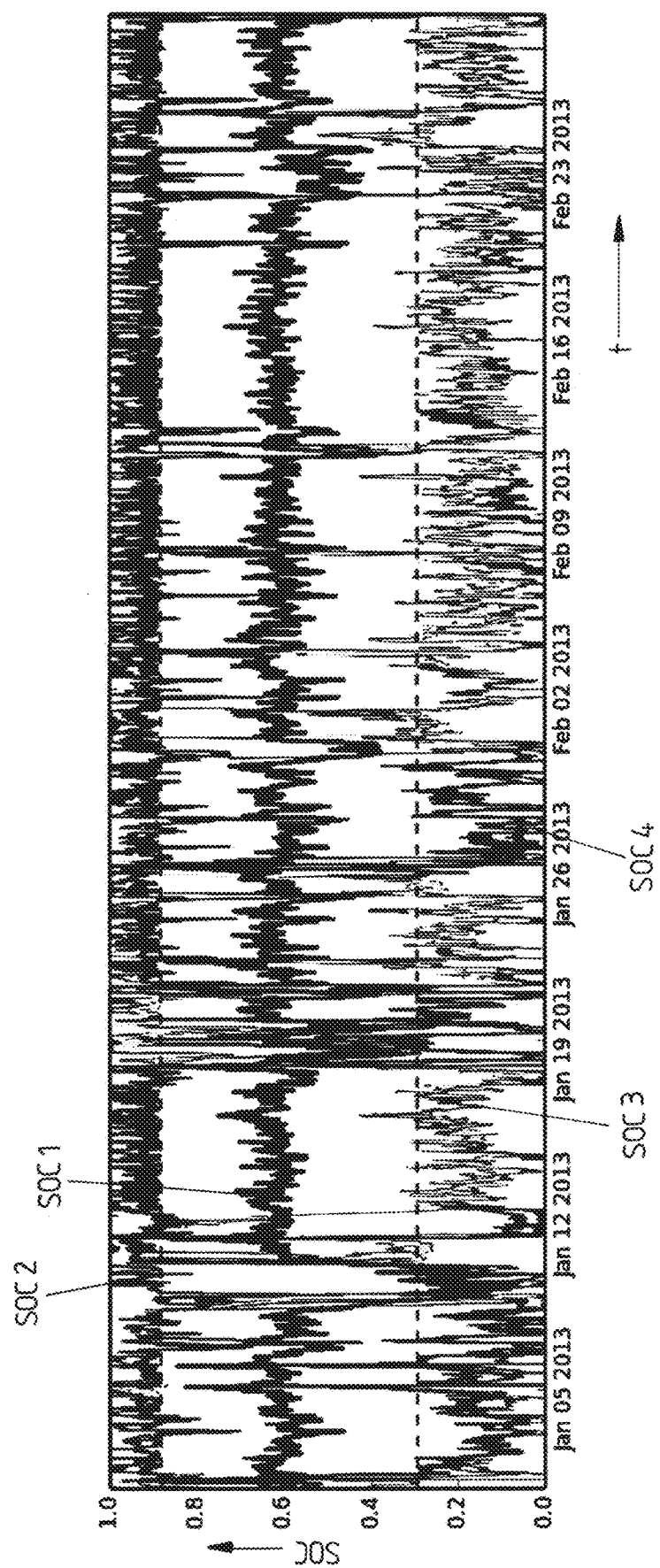

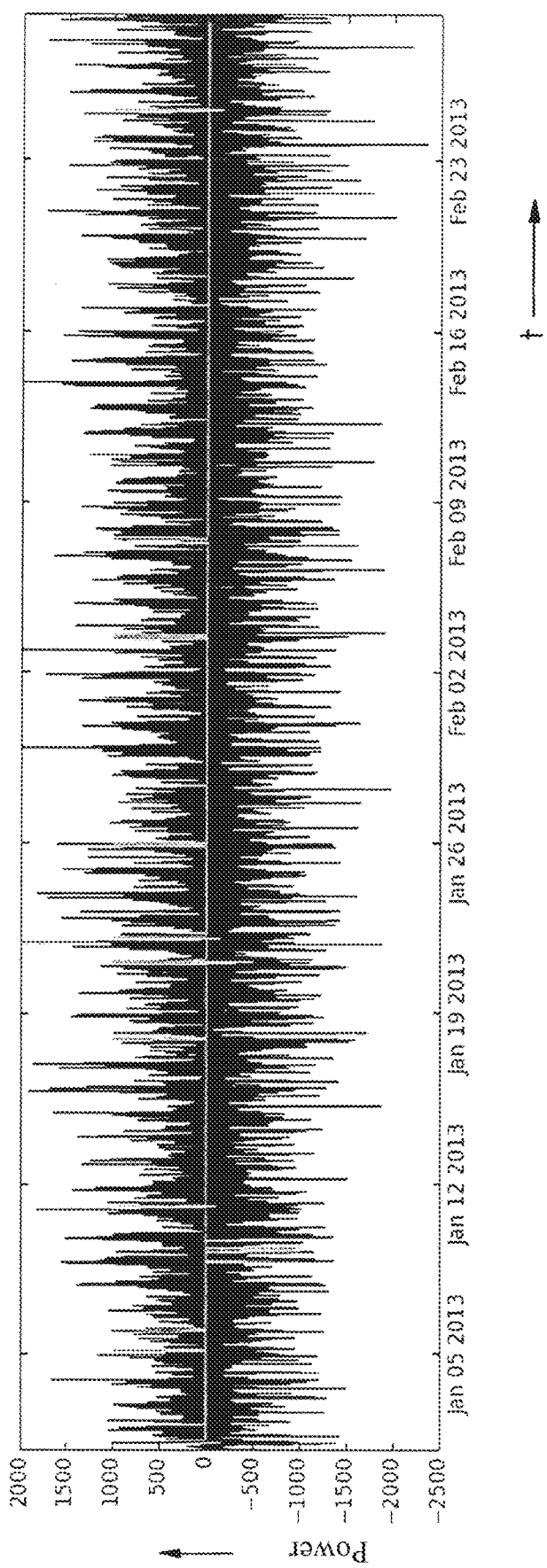

METHOD AND APPARATUS FOR OPERATING AN ELECTRICAL ENERGY STORAGE SYSTEM

CROSS-REFERENCE TO RELATED PATENT APPLICATIONS

This application is a Continuation of International Patent Application Number PCT/EP2015/061555, filed on May 26, 2015, which claims priority to and the benefit of German Patent Application Number 10 2014 210 010.0, filed on May 26, 2014. The entire disclosures of International Patent Application Number PCT/EP2015/061555 and German Patent Application Number 10 2014 210 010.0 are incorporated by reference herein.

BACKGROUND

This application relates to a method for operating an electrical energy storage system and to an apparatus for implementing the method.

In order to cover peak loads and to regulate the mains voltage and line frequency of electrical energy supply grids, in addition to conventional power stations, energy storage systems in the form of battery storage power plants in the megawatts range are also used which are characterized in particular by a quick response and by good controllability and are therefore used increasingly for setpoint power regulation or real power or reactive power regulation. For this purpose, however, it is necessary for the energy storage system to largely be at an optimum energy level or state of charge, which ensures both the consumption of electric power from the electrical energy supply grid and the output of electric power to the electrical energy supply grid. In this case, the energy level of the grid-coupled consisting of a plurality of electrochemical energy storage units, which are connected electrically to one another at a point of common coupling, is determined by the setpoint power produced over time at the point of common coupling and the total efficiency of the energy storage system.

In particular in applications in which the required setpoint power cannot be determined in advance, such as is the case for grid services in which there is regulation to a specific grid characteristic variable, such as the frequency, this power produced over time can drive the energy level beyond preset limit levels and in extreme cases result in it no longer being possible for the setpoint power to be produced.

An energy storage system in the form of a battery storage power plant generally consists of a plurality of storage units or battery modules comprising a multiplicity of electrochemical storage elements in the form of DC-voltage batteries or rechargeable batteries connected in parallel and/or in series, which batteries or rechargeable batteries each have, owing to the use of specific storage technologies, the same chemical and/or physical properties, which require state of charge ranges, operating temperatures and charging and discharge cycles which are preset for optimum operations.

A further criterion in the use of the storage units consists in the costs and the life expectancy of the storage elements used and power electronics components such as inverters, step-up converters, converters or the like used in the storage units, wherein the life expectancy is also dependent, inter alia, on the number of charge and discharge cycles.

SUMMARY

An object of the present application consists in specifying a method for operating an electrical energy storage system of the type mentioned at the outset with which the total energy level of the energy storage system consisting of a plurality of storage units is set in such a way that, at any time and over a preset time span, the production of setpoint power, i.e. the consumption of electrical power from the energy supply grid or the output of electric power to the energy supply grid, is ensured and the energy level of the individual storage units is optimized with respect to procurement and operating costs and a long life or retention of a maximum storage capacity.

This object is achieved by a method having the features as described herein.

The solution according to the application ensures, by virtue of targeted, dynamic adaptation of the total efficiency of the energy storage system at any time and over a preset time span, the production of setpoint power and optimum setting of the energy level of the individual storage units of the energy storage system with respect to procurement and operating costs and a long life or the retention of a maximum storage capacity.

Targeted, dynamic adaptation of the total efficiency is implemented by a distribution of the setpoint power among the individual energy stores which is dependent on the present energy level of the energy storage system in order that the setpoint power at the point of common coupling is fulfilled and the total energy level of the energy storage system is set to an optimum value.

Correspondingly, the apparent power or setpoint power, which includes both real power and reactive power, is distributed among the storage units depending on the total energy level of the energy storage system, on the (positive or negative) setpoint power and on the efficiency and characteristic properties of the storage units or on the energy storage technology in such a way that: (a) the total energy level of the energy storage system is set optimally within the energy-based available range so that it does not fall below minimum values and does not exceed maximum values, and (b) the energy levels of the individual storage units are optimized such that unfavorable energy levels with respect to the characteristic properties of the storage units are avoided.

Targeted, dynamic adaptation of the total efficiency provides a degree of freedom in the control of the energy level in the context of the setpoint power of the energy storage system to be produced over time. Unfavorable energy levels of the energy storage system and the individual storage units of the energy storage system can thus be avoided or at least temporally delayed.

In order to set the total energy level of the energy storage system depending on the energy-based availability of electric power from the energy supply grid to which the energy storage system is connected and in order to control the energy levels of the individual storage units, various strategies or control methods are used, as will be apparent to those reviewing the present application.

A first strategy consists in distributing the setpoint power among the storage units depending on the total energy level of the energy storage system, the setpoint power, the efficiency and the characteristic properties of the storage units as well as taking into consideration the costs of the power electronics components and storage elements of the storage units and/or the life expectancy of the power electronics components and storage elements of the storage units.

When distributing the setpoint power among the storage units, it is necessary to ensure that: (a) the energy level of the energy storage system within the energy-based available range does not fall below minimum values and does not exceed maximum values, and (b) unfavorable energy levels of the storage units with respect to the characteristic properties of the storage units are avoided.

In the case of conventional presetting: (a) of the energy-based available range made available by the energy supply grid, (b) of the topology of the storage units and the storage technology of the storage elements of the storage units, and (c) of the costs of the power electronics components and storage elements of the storage units, preferably a strategy which optimizes: (a) the instantaneous total energy level of the energy storage system, and (b) the life expectancy of the power electronics components and storage elements of the storage units for the distribution of the setpoint power among the storage units is selected.

The above presets can be implemented by virtue of the fact that the setpoint power is distributed among N storage units by presetting of absolute power components $P_N$ of the setpoint power $P_{set}$ to be produced by the N storage units in such a way that the sum of all of the absolute power components $P_N$ of the storage units is equal to the setpoint power $P_{set}$, corresponding to the following equation:

$$P_{set} = \Sigma_N P_N$$

Alternatively, the setpoint power $P_{set}$ can be distributed among N storage units by presetting of relative contribution factors $\lambda_1$ to $\lambda_N$ for the storage units corresponding to the following equation:

$$P_{set} = \Sigma_N \lambda_N * P_{set}$$

wherein the distribution factors $\lambda_1$ to $\lambda_N$ are positive or negative and the sum of all of the contribution factors $\lambda_1$ to $\lambda_N$ is:

$$\Sigma_N \lambda_N = 1$$

In addition or as a further alternative, the setpoint power $P_{set}$ can be distributed among the N storage units in such a way that the losses occurring in the energy storage system are reduced in the case of a low total energy level of the energy storage system and are increased in the case of a high total energy level of the energy storage system.

Advantageous practice-oriented embodiments of strategies for optimizing the distribution of the setpoint power among the storage units and for reducing or increasing the power consumption in the case of a low or high total energy level of the energy storage system are described in more detail and explained below with reference to the exemplary embodiments illustrated in the drawing.

An advantageous apparatus for implementing the method disclosed in the present application is characterized by the fact that the energy storage system has at least two storage units, wherein each storage unit contains: (a) combined at least groupwise, storage elements having identical chemical and/or physical properties, (b) a storage element management system, which controls and monitors the storage elements, (c) a storage unit management system, which controls and monitors the storage units, (d) a power electronics module, and (d) a power electronics module regulation device, and in that the storage element management systems of the storage units are connected to a superordinate energy storage system management device, which controls and monitors the provision of the setpoint power at the point of coupling and the total efficiency of the energy storage system.

Advantageous configurations of the apparatus for implementing the method are described below.

BRIEF DESCRIPTION OF THE DRAWINGS

The interaction of various topologies of storage units and the battery technologies used in the storage units as well as the effects of various strategies and control methods for setting the total energy level of the energy storage system and for optimizing the energy levels of the individual storage units will be explained in more detail with reference to the exemplary embodiments illustrated in the figures of the drawing.

FIG. 3 shows a schematic illustration of the efficiency of the energy storage system, which is dependent on the total energy level, with minimized or maximized losses in individual energy level ranges.

FIG. 4 shows a schematic illustration of the efficiency, which is dependent on the total energy level of the energy storage system, with minimized or maximized losses in individual energy level ranges and losses which are gradually matched between these ranges.

FIG. 5 shows a schematic illustration of the power losses over the setpoint power to be produced by the energy storage system.

FIG. 6 shows a graph reproducing the time profile of the state of charge of the energy storage system and the storage units over a relatively long time span.

FIG. 7 shows a power profile of the energy storage system corresponding to the graph shown in FIG. 6.

DETAILED DESCRIPTION

Figure 1:
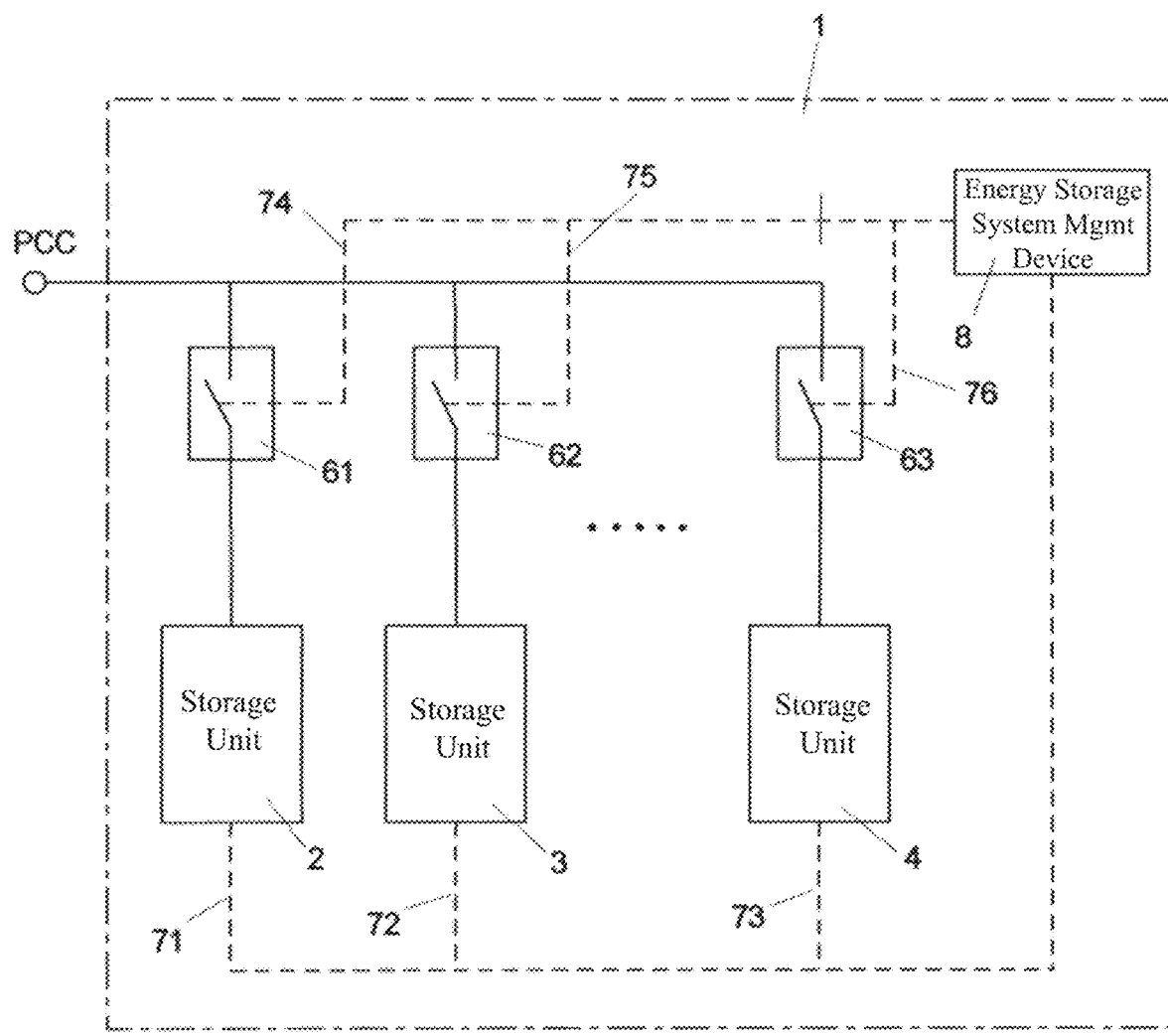
FIG. 1 shows a simplified block circuit diagram of an energy storage system comprising a plurality of storage units, which are connected to one another at a point of coupling and are controlled by a central control device.

FIG. 1 shows a schematic block circuit diagram of an energy storage system 1 comprising N storage units 2, 3, 4, which are connected, by means of electrical lines (illustrated by continuous lines), to a point of common coupling PCC via a plurality of circuit breakers 61, 62, 63 and to a central control device in the form of an energy storage system management device 8, which actuates the plurality of circuit breakers 61, 62, 63 via control lines 74, 75, 76, via communications lines 71, 72, 73 (illustrated by dashed lines). The N storage units 2, 3, 4 contain power electronics modules in the form of inverters, converters or step-up converters, wherein the topology of the power electronic modules of the individual N storage units 2, 3, 4 can correspond to one another or differ from one another, and the storage elements whose storage technology can vary from storage unit to storage unit generally corresponds within a storage unit, however. Only storage units 2, 3, 4 with storage elements of the same storage technology combined in groups can also use different storage technologies with a correspondingly matched topology of the power electronics modules.

Therefore, the individual storage units 2, 3, 4 form a hybrid energy storage system, whose individual storage units 2, 3, 4 have mutually identical or different electrical properties. The energy storage system 1 formed from the storage units 2, 3, 4 connected in parallel provides, at the point of common coupling PCC, a preset setpoint electric power, which is provided, for example, for exchanging electrical energy with an electrical energy supply grid, for example for covering peak loads or for primary regulation of an electrical power supply grid.

Figure 2:
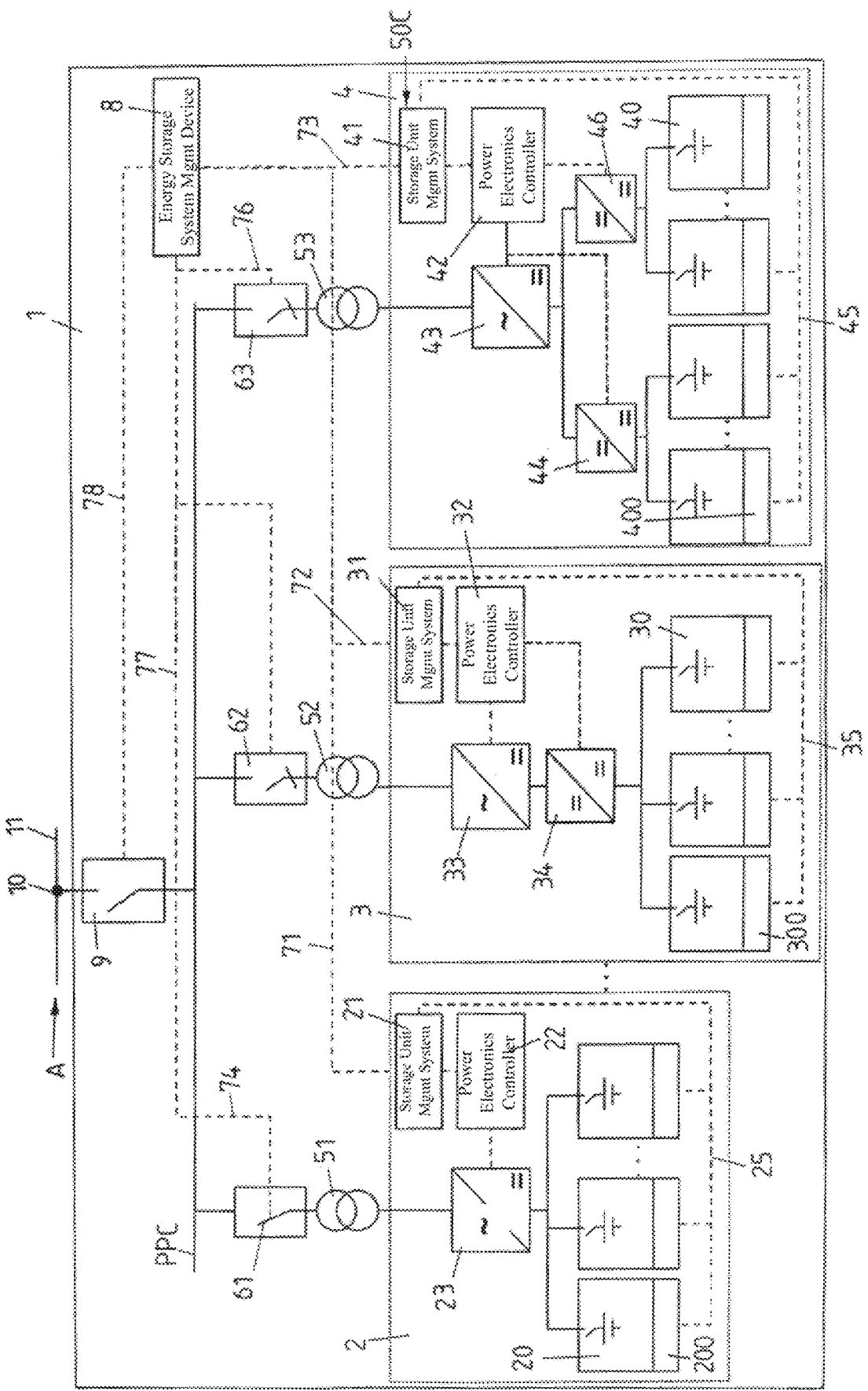
FIG. 2 shows a detailed block circuit diagram of an energy storage system comprising a plurality of storage units of different topology and battery technologies.

FIG. 2 shows a detailed block circuit diagram of an energy storage system 1 comprising storage units 2, 3, 4 with a different topology of the power electronics modules, i.e. the inverters or converters or step-up converters, and possibly different storage technologies, wherein the electrical lines are illustrated using solid lines, and the communications links or control lines are illustrated using dashed lines.

The energy storage system 1 is connected to a grid connection point 10 of an energy supply grid 11 and contains three parallel-connected storage units 2, 3, 4, which are each connected to the grid connection point 10 of the energy supply grid 11 via a transformer 51, 52, 53, a plurality of circuit breakers 61, 62, 63 and a common grid connection circuit breaker 9. The storage units 2, 3, 4 have a plurality of parallel-connected storage elements 20, 30, 40, of which each storage element 20, 30, 40 can comprise a plurality of batteries or rechargeable batteries connected in series. Each of the storage elements 20, 30, 40 has a storage element management system 200, 300, 400, which is connected to a storage unit management system 21, 31, 41 for each storage unit 2, 3, 4.

The storage element management systems 200, 300, 400 monitor the storage elements 20, 30, 40 and provide a communications interface to the storage unit management systems 21, 31, 41. The storage unit management systems 21, 31, 41 are connected to the superordinate energy storage system management device 8, which actuates the plurality of circuit breakers 61, 62, 63 of the individual storage units 2, 3, 4 and the grid connection circuit breaker 9 and exchanges control signals with the storage unit management systems 21, 31, 41.

The first storage unit 2 contains a plurality of parallel-connected storage elements 20, which can consist of a series circuit comprising a plurality of batteries in order to provide a relatively high voltage, and are provided with in each case one storage element management system 200. The storage elements 20 are connected to an inverter 23, which is connected to a first transformer 51.

The second storage unit 3 contains a plurality of parallel-connected storage elements 30, which are provided with storage element management systems 300 and are connected to a step-up converter 34, which is connected to an inverter 33, connected to a second transformer 52.

The third storage unit 4 contains a plurality of storage elements 40, which are combined groupwise, are connected in parallel, are provided with a storage element management system 400 and are connected to an inverter 43 via a step-up converter 44, 45, which is assigned in each case to one of the groups, which inverter is connected to a third transformer 53.

The storage elements 40 of the third storage unit 4 can have different storage technologies in the two storage element groups which are connected to one or the other step-up converters 44, 45.

The storage element management systems 200, 300, 400 of the storage units 2, 3, 4 are connected to the storage unit management systems 21, 31, 41 via communications lines 25, 35, 45, to which storage unit management systems power electronics controllers 22, 32, 42 are connected, which actuate the respective inverter 23, 33, 43 and/or step-up converter 34, 44, 45 of the storage units 2, 3, 4.

The storage unit management systems 21, 31, 41 optimize the use of the subcomponents of the storage units 2, 3, 4 and enable, inter alia, maintenance of the subcomponents during running operation. The superordinate energy storage system management device 8 regulates the interplay between the storage units 2, 3, 4, coordinates and controls the maintenance demands of the storage units 2, 3, 4 and distributes the demands on the energy storage system 1 among the individual storage units 2, 3, 4, both in order to control the total efficiency or total energy level of the energy storage system 1 and also to control the individual efficiency or energy levels of the storage units 2, 3, 4 in order to optimize the total energy level of the energy storage system 1 and the energy levels of the individual storage units 2, 3, 4.

The superordinate energy storage system management device 8 represents the central control plane of the energy storage system 1 by virtue of it combining the information made available by the storage units 2, 3, 4, inter alia as regards the energy level or the state of charge of the storage units 2, 3, 4, in order to optimize the working point presets for the individual storage units 2, 3, 4 depending on the demands as regards the setpoint power set by the energy supply grid 11 and to be met by the energy storage system 1.

The storage units 2, 3, 4 of the energy storage system 1 can have: (a) in each case a different topology of the power electronics modules 23, 33, 43; 34, 44, 46 and a different technology of the electrochemical storage elements 20, 30, 40, (b) a corresponding topology of the power electronics modules 23, 33, 43; 34, 44, 46 in the case of a different technology of the electrochemical storage elements 20, 30, 40, (c) a partially corresponding topology of the power electronics modules 23, 33, 43; 34, 44, 46 in the case of a partially different technology of the electrochemical storage elements 20, 30, 40 or (d) a corresponding topology of the power electronics modules 23, 33, 43; 34, 44, 46 and corresponding technology of the electrochemical storage elements 20, 30, 40, wherein the type and configuration of the individual storage units 2, 3, 4 can be both for economic reasons because, for example, electrochemical storage elements 20, 30, 40 of one type are less expensive than storage elements 20, 30, 40 of another type and for technical reasons because, for example, storage elements 20, 30, 40 of different storage technology with different chemical and/or physical properties can be used.

Thus, for example, lithium-ion batteries have a high energy density of 120 to 210 Wh/kg and, for a space-saving arrangement, have a high volumetric energy density of 500 Wh/l, i.e. a very high power-to-energy ratio with a C rate of 1 or more and are therefore particularly suitable as short-term storage devices and for compensating for large, short-term fluctuations by the provision of control power. For a long life, lithium-ion batteries require an ambient or operating temperature of approximately 15° C. given a state of charge of 40 to 80% of the full charge, however.

Sodium-sulfur batteries, on the other hand, have a very high storage capacity with a C rate of ⅙ given an energy density of 120 to 220 Wh/kg, with the result that they are particularly suitable for compensating for daily fluctuations in wind and solar energy, but, as high-temperature batteries, require an operating temperature of 300° C., which entails heat losses of 15 to 30%.

Storage elements on the basis of vanadium redox flow have virtually no self-discharge, with the result that they are extremely suitable, inter alia, as seasonal storage elements. Since, in addition, vanadium redox flow batteries do not age and are not subject to wear, they have virtually unlimited durability with a low level of maintenance complexity involved and, depending on the requirements, power and energy can be scaled separately and flexibly.

Since the precise demands on a storage element can vary depending on the application case and sometimes also in project-specific fashion, which relates to many properties, but particularly the power-to-energy ratio, if required different technologies are combined in a hybrid storage unit so that the advantages of the different technologies can be used within one storage unit.

For optimum setting of the total energy level of the energy storage system 1 within the energy-based available range and for optimum setting of the energy level of the individual storage units 2, 3, 4 so as to avoid unfavorable energy levels of the individual storage units 2, 3, 4, the setpoint power $P_{set}$ to be provided at the grid connection point 10 of the energy supply grid 11 is distributed among the individual storage units 2, 3, 4 by presetting of absolute power components $P_N$, with the result that the sum of all of the absolute power components $P_N$ of the N storage units 2, 3, 4 is identical to the setpoint power $P_{set}$ of the energy storage system 1 to be provided:

$$P_{set} = \Sigma_N P_N$$

Alternatively, the setpoint power $P_{set}$ to be provided at the grid connection point 10 of the energy supply grid 11 can be distributed among the N storage units 2, 3, 4 by presetting of relative contribution factors $\lambda_N$ for the N storage units 2, 3, 4 corresponding to the following equation:

$$P_{set} = \Sigma_N \lambda_N * P_{set}$$

wherein the contribution factors $\lambda_N$ are positive or negative and the sum of all of the contribution factors is:

$$\Sigma_N \lambda_N = 1$$

The energy level of the energy storage system 1, i.e. the total electrical energy stored in the storage units 2, 3, 4, is dependent on the electric power consumed from the electrical energy supply grid 11 or output to the electrical energy supply grid 11 via the grid connection point 10 and on the total efficiency of the energy storage system 1.

In order to prevent the setpoint power $P_{set}$ produced over a specified time period, i.e. the respectively consumed or output real and reactive power, from changing the energy level of the energy storage system 1 beyond preset limit levels, which in the extreme case results in the energy storage system 1 no longer being able to produce the required setpoint power $P_{set}$, the total efficiency of the energy storage system 1 is matched dynamically within the framework of energy available for avoiding unfavorable energy levels both with respect to the total energy level of the energy storage system 1 and with respect to the energy levels of the individual N storage units 2, 3, 4. This will be explained in more detail with reference to the graphs illustrated schematically in FIGS. 3 to 5.

In principle, the energy storage system management device 8 distributes the setpoint power $P_{set}$ to be provided at the grid connection point 10 of the energy supply grid 11 among the storage units 2, 3, 4 by corresponding actuation of the storage unit management systems 21, 31, 41 in such a way that the losses occurring in the energy storage system 1 are reduced in the case of a low total energy level of the energy storage system 1 and are increased in the case of a high total energy level of the energy storage system 1.

For this purpose, in accordance with FIG. 3, which schematically illustrates the profile of the efficiency of the energy storage system 1 over the state of charge SOC of the energy storage system 1, in order to avoid extreme energy levels, the total range of possible energy levels of the energy storage system 1 is divided into three ranges $S_1 < S_0 < S_4$. The first range $S_0$ is the desired range, the second range $S_1$ is a range of low total energy levels and the third range $S_4$ is a range of high total energy levels of the energy storage system 1. While the total efficiency of the energy storage system 1 is uninfluenced in the first range $S_0$, in the second range $S_1$ the absolute power components $P_N$ or the contribution factors $\lambda_1$ to $\lambda_N$ of the storage units 2, 3, 4 are matched dynamically in such a way that the losses of the energy storage system 1 are minimized and correspondingly the total efficiency of the energy storage system 1 is maximized. In the third range $S_4$, the absolute power components $P_N$ or the contribution factors $\lambda_1$ to $\lambda_N$ of the storage units 2, 3, 4 are matched dynamically in such a way that the losses are maximized and, correspondingly, the total efficiency of the energy storage system 1 is minimized.

In order to be able to respond to discrepancies between the total energy level of the energy storage system 1 and the desired energy level quickly and with constant transitions, the total range of possible energy levels of the energy storage system 1 shown in FIG. 4 can also be divided into five ranges $S_1 < S_2 < S_0 < S_3 < S_4$, however. In this case the first range $S_0$ is the desired range. $S_1$ is a second range of low total energy levels, in which the contribution factors $\lambda_1$ to $\lambda_N$ are matched dynamically in such a way that the losses of the energy storage system 1 are minimized and the total efficiency of the energy storage system 1 is maximized. $S_4$ is a third range of high total energy levels of the energy storage system 1, in which the contribution factors $\lambda_1$ to $\lambda_N$ are matched dynamically in such a way that the losses are maximized and the total efficiency of the energy storage system 1 is minimized. In the fourth range $S_2$ and fifth range $S_3$, there is a gradual drop in the total efficiency.

Specifically, various strategies are used for this purpose, which strategies are dependent: (a) on the energy-based available range made available by the energy supply grid 11, (b) on the topology and storage technology of the storage units 2, 3, 4, (c) on the costs of the individual power electronics modules 23, 33, 43; 34, 44, 46 and storage elements 20, 30, 40, (d) on the instantaneous total energy level of the energy storage system 1, and (e) on the life expectancy of the individual power electronics modules 23, 33, 43; 34, 44, 46 and storage elements 20, 30, 40.

Since parameters (a) to (c) are not influencable by the energy storage system management device 8 by setting the energy levels of the storage units 2, 3, 4 of the energy storage system 1, the respectively used strategy is dependent on parameters (d) and (e), namely on the total energy level of the energy storage system 1 taking into consideration the limits set by the energy-based available range and on the preset or selected topology and storage technology of the storage units 2, 3, 4 and the life expectancy of the individual components.

In order to decrease a high total energy level of the energy storage system 1 which is above the optimum range, as shown in FIG. 5 the losses within the energy storage system 1 are increased, while they are reduced in the case of a low total energy level of the energy storage system 1 which is below the optimum range.

FIG. 5 shows the profile of the power losses of a storage unit over the power to be produced by the storage unit and clarifies the losses of the storage units in the case of an increase in negative partial power which has a polynomial profile in the case of a power to be consumed from the energy supply grid 11 and increases in the case of a partial power to be output to the electrical energy supply grid 11 via the grid connection point 10 owing to the power losses occurring during discharge.

In order to decrease a high total energy level of the energy storage system 1, in a first step the distribution of power among the storage units 2, 3, 4 is selected by means of the contribution factors $\lambda_N$ for actuating the storage unit management systems 21, 31, 41 in such a way that the power-dependent losses in the total system are maximized.

As a further measure, energy is exchanged or shifted between the storage units 2, 3, 4 of the energy storage system 1 by corresponding actuation of the storage unit management systems 21, 31, 41 of the storage units 2, 3, 4 by the energy storage system management device 8, with the result that the energy exchanged between the storage units 2, 3, 4 within the energy storage system 1 cannot be measured at the point of common coupling of the storage units 2, 3, 4, but increases the internal power-dependent total losses of the energy storage system 1, and therefore the total efficiency of the energy storage system 1 is reduced. In this case, individual contribution factors $\lambda_N$ of the N storage units 2, 3, 4 have different mathematical signs, but it is still true that the sum of all of the contribution factors is:

$$\Sigma_N \lambda_N = 1$$

The reduction in a high total energy level by energy exchange between the individual storage units 2, 3, 4 of the energy storage system 1 is achieved by virtue of the fact that, during charging and discharging of electrochemical storage elements, heat is released by the internal resistance of the storage element cells, as a result of which some of the energy used for charging is lost, so that power losses occur both during charging and during discharging of the storage units 2, 3, 4, which power losses overall increase the total internal losses of the energy storage system 1.

Furthermore, the power electronics modules 23, 33, 43; 34, 44, 46 such as step-up converters, converters and transformers also have a specific, power-dependent loss behavior.

In order to determine the optimum contribution factors $\lambda_N$, the energy storage system management device 8 uses special power-loss models of the specific power electronics modules 23, 33, 43; 34, 44, 46 and the specific battery technologies of the individual storage units 2, 3, 4 to calculate the power-dependent losses.

Exchange of energy between the individual storage units 2, 3, 4 by means of actuation of the storage unit measurement systems 21, 31, 41 of the storage units 2, 3, 4 by the energy storage system measurement device 8 even takes place when the energy level of a storage unit 2, 3, 4 or a plurality of storage units 2, 3, 4 is in a range which should be avoided with respect to the characteristic properties of the storage units 2, 3, 4 in question or comes close to this range. As a result, a long life or the maintenance of the high storage capacity of the storage units 2, 3, 4 is ensured.

In this case, the energy storage system management device 8 uses specific energy level aging models of the individual storage units 2, 3, 4 to determine the energy levels to be avoided. In addition to a purely random calendar-based energy level aging model, the energy storage system management device 8 also uses more complex and multilayered aging models which take into consideration calendar-based, power-dependent, temperature-dependent and energy level-dependent aging, for individual storage units.

In order to influence the total efficiency of the energy storage system 1 in a targeted manner, components of the storage units 2, 3, 4 and of the total energy storage system 1 are also used as auxiliaries for heating and cooling the storage elements 20, 30, 40 and the power electronics modules 23, 33, 43; 34, 44, 46 as controllable loads for increasing and reducing power losses in order to increase the own requirements of the energy storage system 1 and thus to reduce its total efficiency or in order to reduce the own requirements of the energy storage system 1 and thus to increase its total efficiency.

For this purpose, models for the power regulation of the various specific auxiliaries of the energy storage system management device 8 are used. In order to optimize the cooling or heating power, the energy storage system management device 8 in turn uses power-temperature models of the individual storage units 2, 3, 4, their power electronic modules 23, 33, 43; 34, 44, 46 and the storage elements 20, 30, 40 connected thereto. Furthermore, the energy storage system management device 8 takes into consideration the associated temperature-dependent aging of the individual storage units 2, 3, 4, of their power electronics modules 23, 33, 43; 34, 44, 46 and of the storage elements 20, 30, 40 connected thereto in this power regulation of the various specific auxiliaries.

At a high total energy level of the energy storage system 1, therefore, in a further step inactive auxiliaries of the storage units 2, 3, 4 are connected or the power consumption of already activated auxiliaries is increased in order to increase the losses in the energy storage system 1.

At a low total energy level of the energy storage system 1, on the other hand, the losses in the energy storage system 1 are reduced and minimized in the extreme case, but also the energy level of the individual storage units 2, 3, 4 is optimized taking into consideration the storage technology thereof in the case of a potentially possible power consumption from the energy supply grid 11 by corresponding control and distribution of the energy consumption among the storage units 2, 3, 4, by the energy storage system management device 8.

In a first step, the power distribution among the storage units 2, 3, 4 is selected by means of the contribution factors $\lambda_N$ for actuating the storage unit management systems 21, 31, 41 corresponding to the power-dependent loss models in such a way that the power-dependent losses in the energy storage system 1 are minimized.

In a second step, furthermore individual storage units 2, 3, 4, which are not required for fulfilling the setpoint power of the energy storage system 1, are disconnected stepwise in a preset sequence, as a result of which off-load losses are minimized and thus the total efficiency of the energy storage system 1 is increased.

For stepwise disconnection of unrequired storage units 2, 3, 4, pulse width modulation of the power electronics modules 23, 33, 43 and 34, 44, 46 of the storage units 2, 3, 4 which are not required for fulfilling the setpoint power of the energy storage system 1 is turned off or the storage units 2, 3, 4 which are not required for fulfilling the setpoint power of the energy storage system 1 are electrically disconnected from the point of coupling of the storage units 2, 3, 4, the internal busbar or the grid connection point 10 of the energy supply grid 11.

The setpoint power $P_{set}$ to be produced by the energy storage system 1 at the point of coupling or at the grid connection point 10 of the energy supply grid 11 is distributed among the remaining M storage units of the in total N storage units 2, 3, 4 of the energy storage system 1 corresponding to the following equation:

$$P_{set} = \Sigma_M P_M = \Sigma_M \lambda_M * P_{set}$$

Wherein $P_M$ are the partial powers to be produced by the individual remaining storage units and $\lambda_M$ are the contribution factors of the remaining storage units 2, 3, 4 for producing the setpoint power $P_{set}$. In this case, the energy storage system management device 8 takes into consideration, on the basis of the switching frequency-aging models and the effect thereof on the life, the costs of the disconnection operations of the storage units 2, 3, 4 and their respective individual components.

At a low total energy level of the energy storage system 1, in a third step the power consumption of auxiliaries as controllable loads such as heating and cooling assemblies of the storage units 2, 3, 4 is decreased in order to reduce the losses in the energy storage system 1 and, in a fourth step, the auxiliaries are disconnected, in so far as possible.

In addition to extreme, i.e. very low or very high, total energy levels of the energy storage system 1, further subranges, in particular mid-ranges, of the total energy level can also be avoided. Such subranges can be determined, for example, by the type of application area of the energy storage system 1, by the efficiencies or the aging models of the individual storage units 2, 3, 4.

FIG. 6 shows, in an exemplary embodiment in which the energy storage system 1 is used for primary regulation, the time profile of the state of charge SOC 1 of the energy storage system 1 (illustrated by a line in bold) and the time profile of the state of charge SOC 2, 3, 4 of the individual storage units 2, 3, 4 (illustrated by a thin line) over a time zone of several weeks.

The graph illustrates how an algorithm established corresponding to the method as disclosed in the present application avoids the unfavorable state of charge range SOC 2, 3, 4 (bounded by dashed lines) of the storage units 2, 3, 4 which, in the graph illustrated, is between 25% and 85% of full charge, for example. Thus, the state of charge SOC 2 of the storage unit 2 is on average in the range between 86% and 100% in the case of daily fluctuations, the state of charge SOC 3 of the storage unit 3 is on average in the range between 0% (discharge) and 25% in the case of daily fluctuations, while the state of charge SOC 4 of the storage unit 4 is on average both in the range between 0% and 25% and in the range between 85% and 100% in the case of daily fluctuations.

On the other hand, the state of charge SOC 1 of the total energy storage system 1 is on average within the range characterized by the dashed lines at 60% to 65% in the case of daily fluctuations, with the result that the energy storage system 1 is set optimally both for a power output to the energy supply grid 11 and for a power consumption from the energy supply grid 11.

FIG. 7 shows a power profile which corresponds to the profile of the state of charge SOC 1 of the energy storage system 1 shown in FIG. 6 with an output of electric power (in kW) of the energy storage system 1 used for primary regulation to the energy supply grid 11 which fluctuates around the zero line or consumption of electric power (in kW) of the energy storage system 1 from the energy supply grid 11.

LIST OF REFERENCE SYMBOLS

1 energy storage system
2, 3, 4 storage units
8 energy storage system management device
9 grid connection circuit breaker
10 grid connection point
11 energy supply grid
20, 30, 40 storage elements
21, 31, 41 storage unit management system
22, 32, 42 power electronics controller
23, 33, 43 inverter
25, 35, 45 communications lines
34, 44, 46 step-up converter
51, 52, 53 transformer
61, 62, 63 circuit breaker
71, 72, 73 communications lines
74-78 control lines
200, 300, 400 storage element management system
M number of remaining storage units
N number of storage units
$P_M$ partial powers of remaining storage units
$P_N$ power components
$P_{set}$ setpoint power
$\lambda_M$ contribution factors of remaining storage units
$\lambda_1$ to $\lambda_N$ contribution factors
PCC point of coupling
SOC state of charge

What is claimed is:

1. A method for operating an electrical energy storage system that is connected to an electrical energy supply grid providing a setpoint power and that includes a plurality of storage units connected electrically to a point of common coupling where the setpoint power is distributed among the plurality of storage units, the method comprising:
   matching a total efficiency of the energy storage system to the setpoint power by adjusting individual power components provided by the plurality of storage units,
   wherein the setpoint power is a consumption of electric power from the electrical energy supply grid by the electrical energy storage system and an output of electric power from the electrical energy storage system to the supply grid.

2. The method of claim 1, wherein the method further comprising:
   distributing the setpoint power among the plurality of storage units based on: total energy level of the electrical energy storage system, the setpoint power, and al efficiency and characteristic properties of the plurality of storage units.

3. The method of claim 1, wherein the method further comprising:
   distributing the setpoint power among the plurality of storage units depending on at least one of:
   costs of power electronics modules and storage elements of the plurality of storage units, or
   life expectancy of the power electronics modules and storage elements of the plurality of storage units.

4. The method of claim 1, wherein the method further comprising:
   distributing the setpoint power among the plurality of storage units such that an energy level of the electrical energy storage system does not fall below minimum values and does not exceed maximum values within an energy-based available range.

5. The method of claim 1, wherein the method further comprising:
   distributing the setpoint power among the plurality of storage units such that energy levels that negatively affect characteristic properties of the plurality of storage units are avoided.

6. The method of claim 1, wherein the method further comprising:
   presetting, by selecting a strategy that optimizes an instantaneous total energy level of the electrical energy storage system and a life expectancy of power electronics modules and storage elements of the plurality of storage units for the distribution of the setpoint power among the plurality of storage units:
an energy-based available range made available by the electrical energy supply group,
a topology of the plurality of storage units and a storage technology of the storage elements of the plurality of storage units, and
costs of the power electronics modules and storage elements of the plurality of storage units.

7. The method of claim 1, wherein the method further comprising:
distributing the setpoint power among N of the plurality of storage units by presetting absolute power components of the setpoint power produced by the storage elements such that a sum of all of the absolute power components of the plurality of storage units is equal to the setpoint power and corresponds to $P_{set}=\Sigma_N P_N$.

8. The method of claim 1, wherein the method further comprising:
distributing the setpoint power among N of the plurality of storage units by presetting relative contribution factors of the plurality of storage units, wherein
the relative contribution factors correspond to $P_{set}=\Sigma_N \lambda_N*P_{set}$, and the relative contribution factors are positive and a sum of all of the contribution factors is $\Sigma_N \lambda_N=1$.

9. The method of claim 8, wherein the method further comprising:
dividing a total range of possible energy levels of the electrical energy storage system into three ranges including:
a first range that is a desired range where the total efficiency of electrical the energy storage system is uninfluenced;
a second range with low total energy levels where the relative contribution factors are matched dynamically such that losses within the electrical energy storage system are minimized and the total efficiency is maximized; and
a third range with high total energy levels is minimized.

10. The method of claim 1, wherein the method further comprising:
distributing the setpoint power among N of the plurality of storage units such that losses occurring in the electrical energy storage system are:
reduced during a low total energy level of the electrical energy storage system, and
increased during a high total energy level of the electrical energy storage system.

11. The method of claim 10, wherein the method further comprising:
dividing a total range of possible energy levels of the electrical energy storage system into five ranges including:
a first range that is a desired range;
a second range with low total energy levels of the electrical energy storage system where relative contribution factors of the plurality of storage units are matched dynamically such that the losses of the electrical energy storage system are minimized and the total efficiency of the electrical energy storage system is maximized;
a third range with high total energy levels of the electrical energy storage system where the relative contribution factors are matched dynamically such that the losses are maximized and the total efficiency is minimized; and
a fourth range and a fifth range where there is a gradual drop in the total efficiency as compared to the first, second, and third ranges.

12. The method of claim 11, wherein the method further comprising:
assigning both positive and negative contribution factors to the plurality of storage units, wherein
the contribution factors are greater than a contribution factor or an individual storage unit, and
the contribution factors add up to a contribution factor of an entirety of the electrical energy storage system.

13. The method of claim 12, wherein the method further comprising:
turning off power electronics modules connected to storage elements of the plurality of storage units that are not required for fulfilling the setpoint power.

14. The method of claim 12, wherein the method further comprising:
disconnecting storage units among the plurality of storage units that are not required for fulfilling the setpoint power from a point of coupling or from a busbar connecting storage elements of the storage units.

15. The method of claim 12, wherein the method further comprising:
disconnecting storage units among the plurality of storage units that are not required for fulfilling the setpoint power at the low total energy level in a preset sequence; and
distributing the setpoint power produced by the electrical energy storage system at point of coupling among a remaining M of the plurality of storage units of the total N of the plurality of storage units according to $P_{set}=\Sigma_M P_M=\Sigma_M \lambda_M*P_{set}$, wherein $P_M$ is partial powers produced by the remaining M of the plurality of storage units and $\lambda_M$ is the contribution factors of the M remaining storage units.

16. The method of claim 1, wherein the method further comprising:
reducing power consumption of auxiliaries of the plurality of storage units or disconnecting the auxiliaries to reduce losses in the electrical energy storage system.

17. The method of claim 1, wherein the method further comprising:
connecting active auxiliaries of the plurality of storage units or increasing power consumption of the active auxiliaries to increase losses in the electrical energy storage system.

18. The method of claim 1, wherein the method further comprising:
exchanging energy between the plurality of storage units when a total energy level of the electrical energy storage system is above a preset value to reduce losses in the electrical energy storage system.

19. The method of claim 1, wherein the method further comprising:
exchanging energy between the plurality of storage units when an energy level of one storage unit among the plurality of storage units is within an avoided range with respect to characteristic properties of the one storage unit.

20. The method of claim 1, wherein the method further comprising:
at a low total energy level of the electrical energy storage system, disconnecting in a stepwise manner individual storage units among the plurality of storage units that are not required for fulfilling the setpoint power.

21. An apparatus for implementing a method for operating an electrical energy storage system that is connected to an electrical energy supply grid providing a setpoint power and that contains at least two storage units connected electrically to a point of common coupling where the setpoint power is distributed among the at least two storage units, the apparatus comprising:
the electrical energy storage system; and
the at least two storage units, wherein
a total efficiency of the electrical energy storage system is matched to the setpoint power by adjusting individual power components provided by the at least two storage units, and
each of the at least two storage units comprises:
storage elements that are combined groupwise and that include at least one of identical chemical or physical properties;
a storage element management system that controls and monitors the storage elements;
a storage unit management system that controls and monitors the at least two storage units;
a power electronics module; and
a power electronics module regulation device, wherein
the storage element management systems of the at least two storage units are connected to a superordinate energy storage system management device that controls and monitors a provision of the setpoint power at the point of coupling and the total efficiency, wherein the setpoint power is a consumption of electric power from the electrical energy supply grid by the electrical energy storage system and an output of electric power from the electrical energy storage system to the supply grid.

22. The apparatus of claim 21, wherein the power electronics modules include:
at least one step-up converter connected to the storage elements; and
an inverter connected;
on a DC side of the inverter to the at least one step-up converter, and
on an AC side of the inverter directly or via a transformer to a busbar or a connection point of the electrical energy supply grid.

23. The apparatus of claim 21, wherein the groupwise storage elements are connected in parallel and are connected to an inverter via each group of assigned step-up converters.

24. The apparatus of claim 21, wherein the storage elements are medium-voltage batteries and are connected to the busbar or a connection point of the electrical energy supply grid via the power electronics module and a circuit breaker.

25. The apparatus of claim 21, wherein,
each of the storage elements are connected to one inverter, and
the inverter of each of the storage elements is connected to primary windings of a three-winding transformer connected on a secondary side to busbar or a connection point of the electrical energy supply grid.

* * * * *